US008775515B2

(12) United States Patent
Lippert et al.

(10) Patent No.: US 8,775,515 B2
(45) Date of Patent: *Jul. 8, 2014

(54) SYSTEM AND METHOD FOR PROVIDING STUDENT PERFORMANCE ALERTS IN AN ONLINE LEARNING ENVIRONMENT

(75) Inventors: Andrew Lippert, Seattle, WA (US); Rohit Agarwal, Bellevue, WA (US)

(73) Assignee: Apex Learning, Inc., Seattle, WA (US)

( * ) Notice: Subject to any disclaimer, the term of this patent is extended or adjusted under 35 U.S.C. 154(b) by 396 days.

This patent is subject to a terminal disclaimer.

(21) Appl. No.: 13/053,061

(22) Filed: Mar. 21, 2011

(65) Prior Publication Data

US 2011/0171622 A1    Jul. 14, 2011

Related U.S. Application Data

(63) Continuation of application No. 12/179,445, filed on Jul. 24, 2008, now Pat. No. 7,912,900.

(51) Int. Cl.
*G06F 15/16* (2006.01)

(52) U.S. Cl.
USPC ............................ 709/204; 434/323; 434/366

(58) Field of Classification Search
USPC .................................. 709/204; 434/323, 366
See application file for complete search history.

(56) References Cited

U.S. PATENT DOCUMENTS

| 5,779,486 A | * | 7/1998 | Ho et al. ........................ 434/353 |
| 7,912,900 B1 | * | 3/2011 | Lippert et al. ................ 709/204 |
| 8,326,211 B1 | * | 12/2012 | Hillier et al. .................. 434/350 |
| 8,491,311 B2 | * | 7/2013 | Bodner et al. ................ 434/323 |
| 2004/0033475 A1 | * | 2/2004 | Mizuma et al. ............... 434/219 |
| 2004/0180317 A1 | * | 9/2004 | Bodner et al. ................ 434/353 |
| 2006/0127870 A1 | * | 6/2006 | Fields et al. .................. 434/350 |
| 2007/0269788 A1 | * | 11/2007 | Flowers et al. ............... 434/350 |
| 2007/0281287 A1 | * | 12/2007 | Marioneaux, Jr. ............ 434/353 |
| 2008/0057480 A1 | * | 3/2008 | Packard et al. ............... 434/188 |
| 2008/0138786 A1 | * | 6/2008 | Redd et al. .................... 434/362 |

* cited by examiner

*Primary Examiner* — Duyen Doan
(74) *Attorney, Agent, or Firm* — Patrick J. S. Inouye; Krista A. Wittman

(57) ABSTRACT

A system and method for providing student performance alerts in an online learning environment is provided. An online learning environment is monitored. A score for a test taken by a student at a first time is received. One or more previous scores for previous tests taken by the student at previous times are obtained. The score is compared with one or more of the previous scores to determine a difference between the score and the one or more previous scores. A change threshold is applied to the difference and the difference is determined to be significant when the difference is outside the threshold. An alert for the significant difference is transmitted to one or more recipients associated with the student.

22 Claims, 13 Drawing Sheets

80

SYSTEM AND METHOD FOR PROVIDING STUDENT PERFORMANCE ALERTS IN AN ONLINE LEARNING ENVIRONMENT

CROSS-REFERENCE TO RELATED APPLICATION

This patent application is a continuation of Ser. No. 12/179,445, filed Jul. 24, 2008 U.S. Pat. No. 7,912,900, issued on Mar. 22, 2011, the priority date of which is claimed and the disclosure of which is incorporated by reference.

FIELD

The invention relates in general to online education, and in particular, to a system and method for providing student performance alerts in an online learning environment.

BACKGROUND

Education is important in our society. Each year, significant time and money are spent on improving the quality of education, increasing scores on standardized tests, and stimulating students' interests in learning. Today's students come from a wide variety of backgrounds, social economic levels, and ethnicities. Traditional teaching methods have shown to be ineffective for all types of students, and alternative learning methods provide some students with an education better tailored to their specific learning needs. Alternative learning is often beneficial because students are presented with educational materials through non-traditional methods. For example, an alternative learning program can be administered to honors students or those students that have fallen behind in class.

With the increase in use of the Internet, online education offers a popular alternative learning method. Online education allows each student to work at his own pace and to access learning materials suitable to his learning style. Students can participate from a traditional school setting or from home.

Generally, online education includes an electronic curriculum of courses that are offered as a stand-alone education or as a supplement to traditional education. Each course provides online lessons, study materials, and assignments, for which the student is responsible. Completed materials can be electronically graded or sent to a live teacher. Should questions arise, the teacher and students can communicate via the Internet. In some settings, no face-to-face interaction ever occurs.

The lack of face-to-face interaction complicates obtaining the teacher's attention. In traditional classrooms, students can simply raise their hand or speak directly to the teacher. In contrast, an online teacher is not readily accessible to her students. If an online teacher is not logged on to her computer, she will be unable to determine whether a particular student needs help or has a question.

Attempts have been made to facilitate communication between educators, students, and parents in an online learning environment. U.S. Patent Publication. No. 2006/0127870, to Fields et al. ("Fields"), discloses notifying an educator, student, or parent that an event requiring a conference has occurred. For instance, if a student's grade falls below a threshold, an alert is sent to schedule an off-line conference. The alert is automatically generated by applying a fixed criteria not adjusted to student or teacher considerations, or on extensive factors. Moreover, Fields fails to provide recipient alert interpretation and temporal alert expiration.

SUMMARY

Conventional online learning environments often lack direct communication between individuals. The lack of communication can hinder the effectiveness of the online learning environment. Education-related alerts and education support groups provide near real time communication of event occurrences between individuals associated with the online learning environment.

An embodiment provides a system and method for providing student performance alerts in an online learning environment. The online learning environment is monitored and a score for a test taken by a student at a first time is received. One or more previous scores for previous tests taken by the student at previous times are obtained. The score is compared with one or more of the previous scores to determine a difference between the score and the one or more previous scores. A change threshold is applied to the difference and the difference is determined to be significant when the difference is outside the threshold. An alert for the significant difference is transmitted to at least one of the student and recipients associated with the student.

A further embodiment provides a system and method for monitoring student progress in an online learning environment. The online learning environment includes a plurality of students and maintains learning material. A predetermined number of times for at least one of the students to pass a test is set. One or more failing scores is received for the test taken by the student at different times. A number of the one or more failing scores is compared to the predetermined number of times to pass the test for that student. The student's access to at least a portion of the learning material is blocked when the number of failing scores exceeds the predetermined number of times to pass the test.

Still other embodiments will become readily apparent to those skilled in the art from the following detailed description, wherein are described embodiments by way of illustrating the best mode contemplated. As will be realized, other and different embodiments are possible and their several details are capable of modifications in various obvious respects, all without departing from the spirit and the scope. Accordingly, the drawings and detailed description are to be regarded as illustrative in nature and not as restrictive.

DETAILED DESCRIPTION

Figure 1:
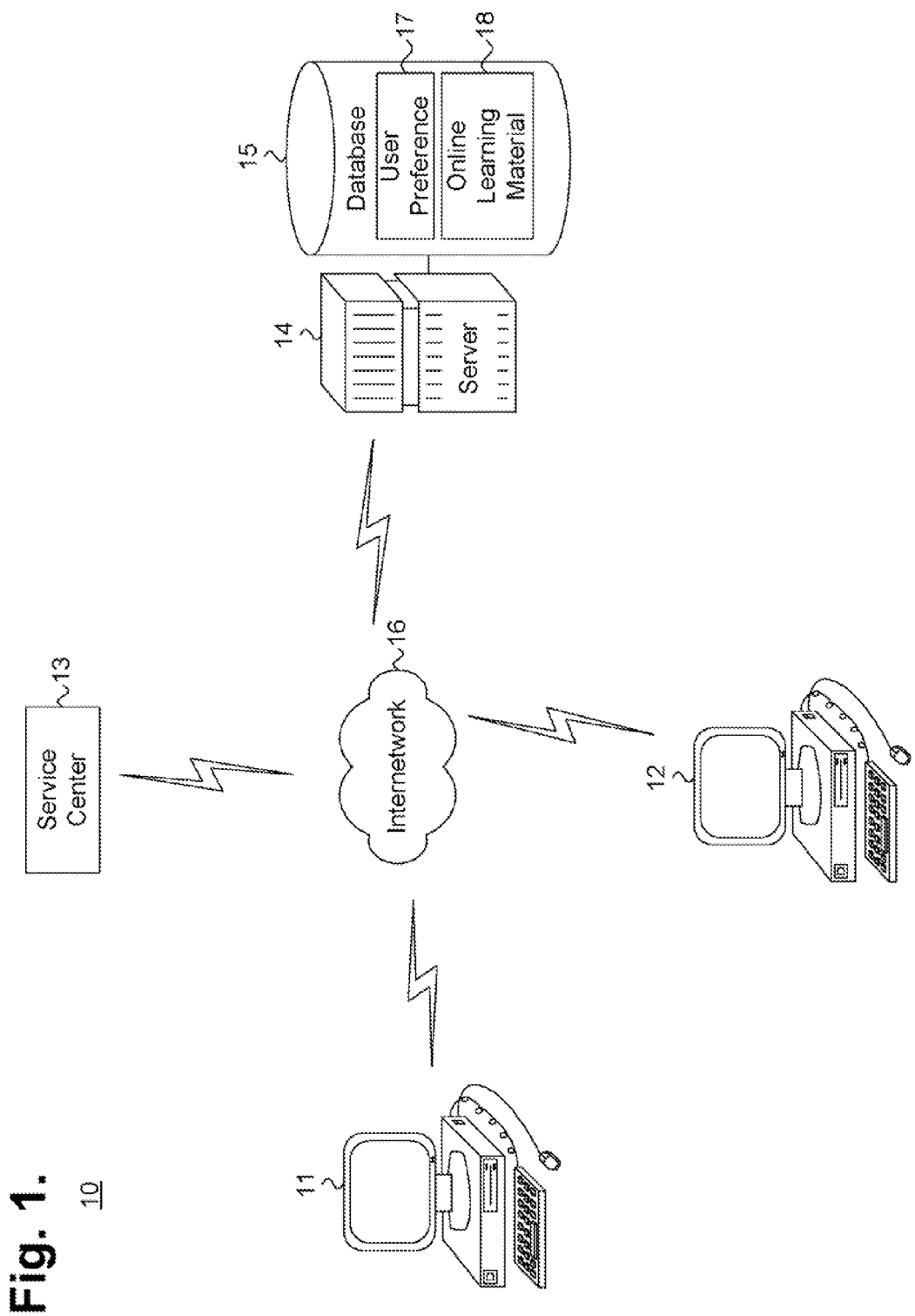
FIG. 1 is a functional block diagram showing an online learning environment.

Increased use of the Internet has led to more options in education through online learning. Online learning provides an alternative for in-classroom learning, which is not always suited to different learning styles and levels. FIG. 1 is a functional block diagram showing an online learning environment. A registered student can access online learning material 18 and enter user preferences 17 through a computer 11 that is connected to a server 14 via an internetwork 16, such as the Internet. The online learning material 18 and user preferences 17 are stored in a database 15 that is coupled to the server 14. The online learning material 18 can include homework assignments, lesson content and plans, online tests, progress reports, and other material. A teacher, often remotely located from the student, is able to post lesson plans, track students' progress, and obtain posted material via a computer 12 that is also connected to the server 14 via the internetwork 16. The teachers and students can communicate with a service center 13 for an online education provider that provides technical support and manages the online curriculum. The service center 13 is remotely connected to the internetwork 16.

Conventional online learning environments do not require the student and the teacher to be logged on to their respective computers at the same time. Instead, communication can occur through email, discussion boards, or instant messaging. Since students can access the online learning environment at any time, the online teacher is often unavailable for immediate questions, unlike a traditional classroom where a student can raise his hand or speak directly to the teacher. In addition, other people having an interest in a student's progress, such as parents, tutors, coaches, and counselors, often do not have access to the student's status or grades. Thus, these individuals often rely on the students for updates on progress. The lack of direct one-to-one communication, as well as absence of face-to-face interactions between teachers, students, and other individuals, can hinder student progress and decrease overall effectiveness of online education as an alternative for traditional teaching methods.

An online learning environment differs from a traditional classroom in which a class of students receive in-person instruction from a live teacher, who provides educational lessons, testing, grading, feedback, and in-classroom activities. The teacher is generally available for discussion with or to answer questions from the students when class is in session, before or after class, or during office hours. Further, interested individuals, such as parents or guardians, can monitor student progress and communicate with the teacher through report cards, parent-teacher conferences, and telephone calls.

Figure 2:
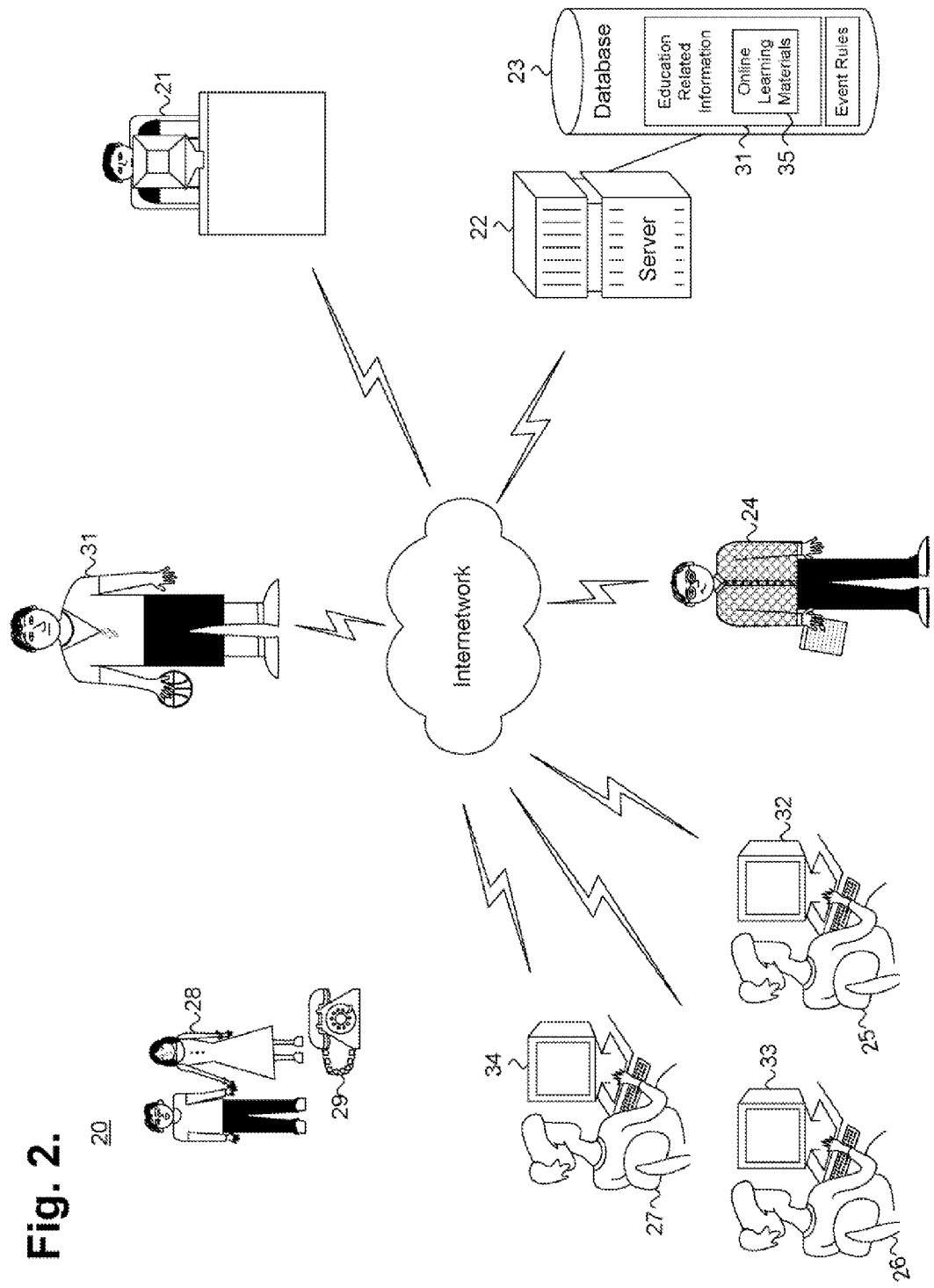
FIG. 2 is a functional block diagram showing an online learning environment with an education support group.

The ease of initiating communication in a traditional classroom setting can also be provided by the online learning environment through education-related alerts and education support groups. The alerts and groups help to increase the effectiveness of the online learning environment by providing surrogate channels of communication. FIG. 2 is a functional block diagram 20 showing an online learning environment with an education support group. In the online learning environment, individuals 21, 24, 25-27, 28 can be associated with the online learning environment directly or through another individual, such as a particular student enrolled. The individuals can include a teacher 21, counselor 24, student 25-27, parent 28, coach 31, or members of the online learning staff (not shown). Other types of individuals are possible. The education support group includes automatic groupings or participant-selected groups of the individuals. Near-simultaneous communication of an event occurrence in the online learning environment is provided to the individuals in the education support group.

In the online learning environment, online teachers 21 are often remotely located from their students 25-27. The students 25-27 can be remotely located from one another or can be located in the same room, such as a traditional classroom. Each student 25-27 enrolled in the online learning environment participates in an online curriculum provided through an Internet accessible computer 32-34. The online curriculum includes online courses offered by the online learning environment and the material associated with the online courses.

Once logged on, a student 25-27 can request particular learning material 35 for an online course, such as a lesson, assignment, or test for display on the computer 32-34. The requested learning material 35 is stored on a database 23, which is coupled to a server 22. The server 22 obtains the requested learning material 35 from the database 23 for serving to the student's computer 32-34.

The online learning material 35 is part of the education-related information 31 maintained by the online environment. The database 23 stores the education-related information 31, which can be served to the student's computer 32-34 via the server 22. The education-related information 31 can include all information in the online learning environment that is related to online educational activities, including the planning, offering, and processing of the online curriculum, as well as a functioning of a system that provides the online learning environment. More specifically, the education-related information 31 can include performance, homework, communication, enrollment, system, and scoring data. However, other types of education-related information are possible. Education-related information is discussed below with further reference to FIG. 4.

An online education provider, including an online learning staff, supervises the online learning environment and maintains the education-related information in the database by generating rules for providing an effective online curriculum. The rules can include processes for assigning passwords, offering courses, selecting coursework, identifying cheating, measuring student progress against established objectives and benchmarks, establishing alternative educational paths through the curriculum, offering additional educationally relevant material to support student learning, administering tests and other coursework, and providing status reports. Other types of rules are possible. The online learning staff can access the education-related information associated with individuals, including all parties having a relationship to the online learning environment, such as the teacher, student, parents, mentors, counselors, administrators, and members of the online learning staff. The members of the online learning staff can observe behaviors exhibited by the individuals, as well as patterns of performance based on the education-related information. Reports and statistics can be generated to show the behaviors, performance, and results of the individuals in the online learning environment, which are then provided with an alert.

The education-related information can also be used to identify events. An event is related to online educational activities, such as performing an action by an individual in the online learning environment, determining an individual's accessibility to use the online learning environment, and determining an online learning status for an individual. Other types of online educational activities are possible. The event can be identified by a change to the education-related information 31, a request for an event, satisfaction of a threshold, change with respect to a baseline or determined by an expert system. A change includes an addition, deletion, or modification of the education-related information. For example, a change to the performance data could be an addition of a student score to an electronic grade book. The student received a score of 74 percent on a test, which is added to the electronic grade book by the online learning environment or assigned by a teacher. The event is the entry of the score the student received on the test, which is related to a student action of taking the exam and the online learning environment or teacher action of grading the exam. In a separate example, a credit recovery organization has preregistered for a particular number of students, which represents an enrollment threshold. Once the enrollment threshold is satisfied, an event is identified and an alert is sent. The event is the satisfaction of the enrollment threshold by the credit recovery organization.

During event identification, a benchmark is determined. A benchmark includes information related to the event, such as a score, report, notification, status, message, or quantity. The benchmark information can be determined based on the education-related information that was changed, collected from, or determined during the occurrence of the event. Other types of benchmark information are possible. The benchmark represents a starting point for interpretation of the event by a recipient of the alert. Event identification is described below with further reference to FIG. 6.

After identification of an event, an alert is generated and transmitted for providing real time notification. An alert includes a template having filled or finable text for information regarding the event, such as the benchmark. Recipient information and response action elements can also be included in the alert. Returning to the previous threshold example, once the enrollment threshold has been satisfied; an event is detected and an alert is transmitted. Additional information can be included in the alert such as charts, graphs, statistics, and previous benchmark information that is related to the event. As described above, the online learning staff or online learning environment can generate the additional information. Alternatively, an individual can prepare the additional information; however, the individual's access to the education-related information can be restricted. Alert generation is discussed below with further reference to FIG. 7.

Recipients of an alert can include an individual or an education support group, which includes multiple individuals with interest in the education-related information or in a particular student enrolled in the online learning environment. The individuals in a an education support group can include a teacher 21, student 25-27, parent 28, administrator (not shown), coach 31, counselor 24, paraprofessional (not shown), tutor (not shown), or a member of an online learning staff (not shown). Other types of interested individuals are possible. For example, an education support group including a parent, coach, and counselor is generated for a particular student. The parent and counselor are concerned with the student's past scores and would like to closely monitor new scores received. In addition, the student is involved in basketball; however, he is not allowed to play if his grades fall below a predetermined threshold. The coach receives alerts with the new scores to ensure that the student is eligible to participate in basketball games. Alert delivery is discussed below with reference to FIG. 8. Upon receipt, each recipient can analyze the alert to determine a significance of the event. Alert interpretation is discussed below with further reference to FIG. 9.

The online learning environment can be modeled after a traditional classroom. For instance, the online learning environment can include a teacher and class that meet virtually through the online learning system, as described in FIG. 1. The online learning environment can be implemented in a variety of organizations, including a traditional classroom or school, an after school program, a credit recovery program, an honors program, a seminar, and for individual students. Additionally, the online learning environment can be modified to include multiple teachers or no teachers. Other types of online learning environments and modifications are possible.

Alert System

Figure 3:
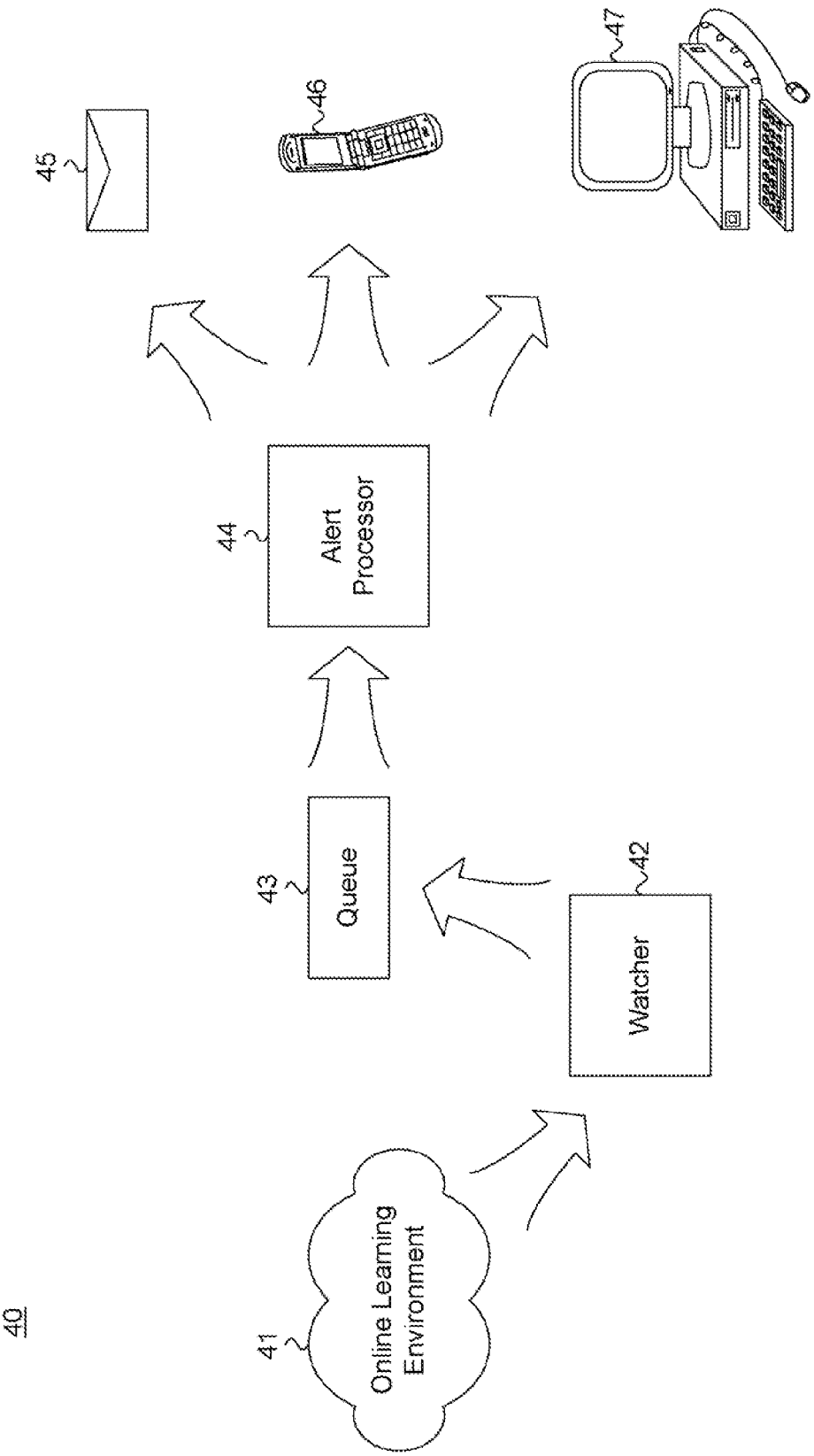
FIG. 3 is a functional block diagram showing a system for providing education-related alerts in the online learning environment of FIG. 1.

The alerts increase the effectiveness of an online learning environment by prompting and facilitating communication between teachers, parents, students, administrators, and members of the online learning staff, as well as others. FIG. 3 is a functional block diagram showing a system 40 for providing an education-related alert in the online learning environment 41 of FIG. 1. The online learning environment manages and tracks education-related information to identify interesting events, which are transmitted to one or more recipients via alerts. The alerts provide a near real time communication between teachers, students, parents, administrators, and members of the online learning staff. The alerts can cover a broad range of topics that are important to providing a successful online learning environment.

A watcher 42 monitors the online learning environment 41 by tracking education-related information. The watcher 42 is a standalone program that passively receives data from the online learning environment 41, such as the education-related information, including performance, homework, communication, enrollment, system, and scoring data. Other types of education-related information are also possible, including data related to a specific online learning environment, which is further discussed below with reference to FIG. 4. The watcher 42 identifies events based on changes in the education-related information, a request for an event, satisfaction of a threshold, a change with respect to a baseline, and as determined by an expert system. Identifying an event is discussed below with further reference to FIG. 6. A benchmark is then determined for the event.

Once identified, events are sent to a queue 43, which is a passive module that holds the events until obtained by an alert processor 44. The events can be ordered in the queue 43 by date or time of receipt, by importance, or by subject matter of the event. Other methods for organizing and holding events in the queue 43 are possible.

Periodically or on demand, the alert processor 44 selects an event from the queue 43 and generates an alert. To generate the alert, the alert processor 44 can select a template based on a type of the event, the benchmark, the subject matter of the event, or other factors. Next, the alert processor 44 determines to whom the alert will be sent. Selecting recipients for an alert is discussed below with further reference to FIG. 7. The alert processor 44 also determines a delivery mechanism for the alert, which can include a Website 47, email 45, SMS text messaging 46, and instant messenger (IM) (not shown). Delivery of the alert is discussed below with further reference to FIG. 8.

Education-Related Information

Figure 4:
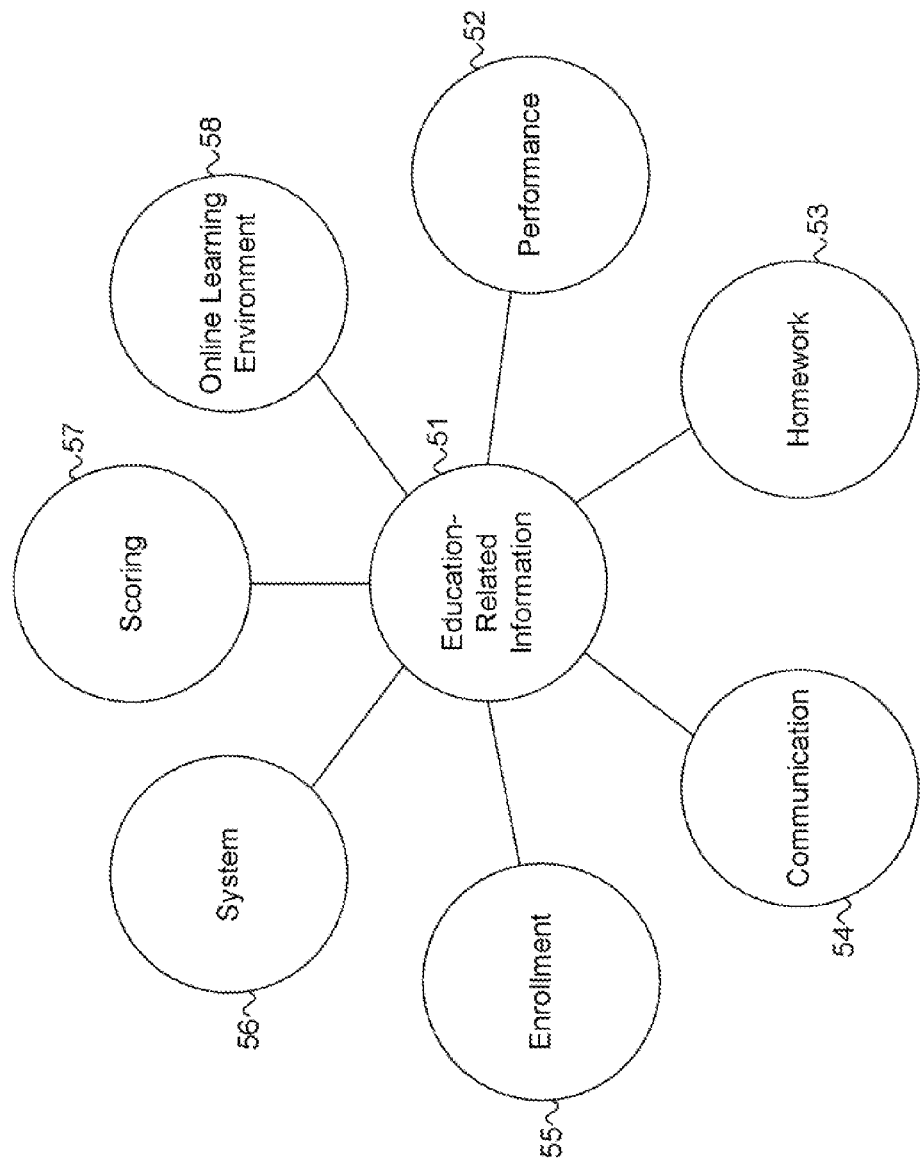
FIG. 4 is a data flow diagram showing categories of education-related information.

A wide range of information is generated during operation of the online learning environment and various pieces of the information may be of interest to the individuals. FIG. 4 is a data flow diagram 50 showing categories of education-related information 51. These categories broadly define topics of possible interest to the individuals, including teachers, students, parents, guardians, mentors, administrators, and members of the online learning staff, as well as other individuals. The education-related information 51 can include performance 52, homework 53, communication 54, enrollment 55, system 56, and scoring data 57. However, other types of data are possible, including data that is specific to a particular online learning environment. Each category will now be discussed in detail.

The performance data 52 can include grade book information for a student, such as test scores, absences, and student identification numbers. Homework data 53 can include whether a student turned in a particular assignment and how well the student performed on the assignment. Performance 52 and homework 53 data is tracked to allow individuals, including students, parents, teachers, and administrators with an up-to-date status of student progress. Each alert can include a report of student activity or inactivity. For example, a student skips school and the teacher enters an unexcused absence into an electronic grade book. The entry of the absence is identified as an event and an alert is generated. The alert is sent to the parents to provide notification that the student was not present in class on that day. Other types of homework and performance data are possible.

Communication data 54 involves initiating a communication session with a teacher, student, parent, administrator, an online learning staff member, or other interested individual or member of an education support group. For instance, communication data 54 can include a question posted on a discussion board or selecting a help button on a Web page associated with the online learning environment. The action of entering the posted question or selecting the help button is identified as an event for which an alert is generated. Scoring data 57 can include information that indicates cheating, which is determined based on a number of factors, such as time, score, and student identity. For example, a change in the scoring data can indicate suspected cheating when a student takes an exam and receives a low score, and within a short time period, re-takes the exam and receives a high score. An alert for the suspected cheating event can be sent to the teacher or administrator to provide notification that an unusual event has occurred that may require action on behalf of the teacher or administrator. Other types of communication and scoring data are possible.

Enrollment data 55 can include information showing enrollment of a new, student, withdraw of a registered student, or a hold status assigned to a registered student. Alerts regarding the enrollment data 55 can be provided to an administrator and a member of the online learning staff when enrollment status changes to determine whether additional subscriptions to the online learning environment should be obtained. System data 56 can include notification of inoperability or inaccessibility of the online learning environment, such as rebooting the online learning system or experiencing a power outage. Alerts regarding the system data 56 can be provided to the teachers, administrators, students, parents, and online learning staff to provide notification that the online learning environment may be inaccessible for use. Other types of enrollment and system data are possible.

Education-related information specific to an online learning environment 58 can include mastery based learning, where each teaching segment or section cumulatively builds on earlier learning. Consequently, mastery of prior material is key and a student who fails one section is generally held back until that section has been successfully mastered. A mastery based learning program requires a student to pass an end-of-section test prior to moving on to the next section of educational material. If a student repeatedly fails to pass the section test, the student is blocked from accessing further materials and must contact a teacher or administrator, who may then unblock student access or recommend further study or tutoring. The alert notifies the teacher or administrator that the student access has been blocked. The student can explain why he failed to pass within a predetermined number of times or can ask for help to successfully pass the section.

Alert Process

Figure 5:
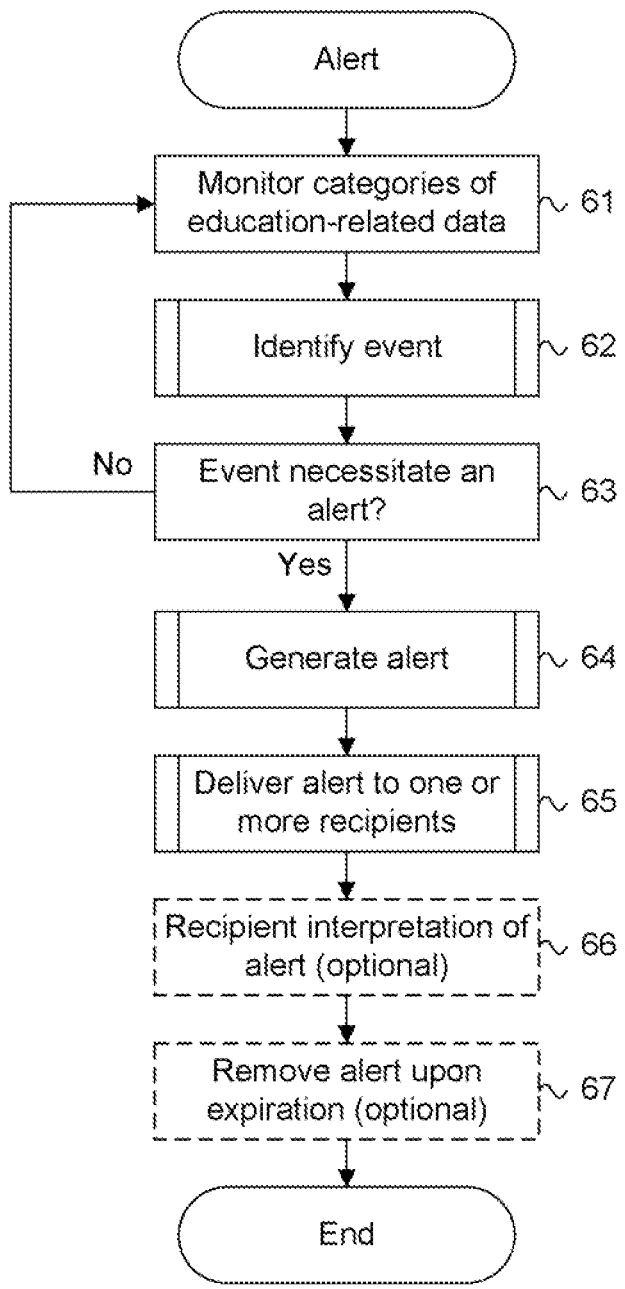
FIG. 5 is a process flow diagram showing a method for providing education-related alerts in the online learning environment of FIG. 1.

Upon identification of an event, an alert is sent to one or more recipients. The alert provides notification of the event occurrence in near real time. FIG. 5 is a process flow diagram 60 showing a method for providing education-related alerts in the online learning environment of FIG. 1. A watcher monitors education-related information 61 on a periodic or continuous basis. If the watcher is set on a periodic basis, a member of the online learning staff can select predetermined times intervals for monitoring the education-related information. The watcher can also monitor all of the education-related information or particular categories of the education-relation information. A member of the online learning staff can generate categories based on a type of the education-related information, such as performance, homework, communication, enrollment, system, and scoring data. Other types of education-related information and categories are possible. The watcher identifies an event 62 based on a change in the education-related information, a request for an event, a satisfaction of a threshold, a change in relation to a baseline, or as determined by an expert system. A benchmark is determined during the event identification, which is discussed below with further reference to FIG. 6.

After an event has been identified 62, the watcher determines whether the event necessitates an alert 63. Alerts provide near real time communication in an online learning environment. Currently, the individuals in a conventional online learning environment experience difficulty in initiating communication based on the responsibility of each individual to proactively check and respond to emails and postings to message boards. If one of the individuals fails to check the email messages or postings on a message board, communication between a receiving individual and a requesting individual cannot occur. The alerts provide near real time notification of an event occurrence if an alert is not necessary, the watcher continues to monitor the education-related information 61. However, if the event requires an alert, an alert is generated 64. Alert generation is discussed below with further reference to FIG. 7. Once generated, the alert is delivered to one or more recipients 65 through one or more delivery mechanisms, including a Website, email, text messaging, or instant messaging. Delivery of the alert is further discussed below with reference to FIG. 8.

Upon receipt of the alert, processing can optionally occur. The processing can include recipient interpretation 66 of the alert based on the benchmark for the event. The interpretation allows the recipients to form an opinion and come to a conclusion on their own regarding a particular event and corresponding benchmark. Recipient interpretation is described below with further reference to FIG. 9.

Optionally, the alert can be associated with an expiration date. Once the expiration date is reached, the alert expires and is automatically removed 67 from an email inbox, text messaging menu, instant messenger, or Website. The expiration date can include a time period, which begins once the alert is received or once the alert has been viewed by the recipient. Other types of expiration dates and time periods are possible.

Identifying an Event

Figure 6:
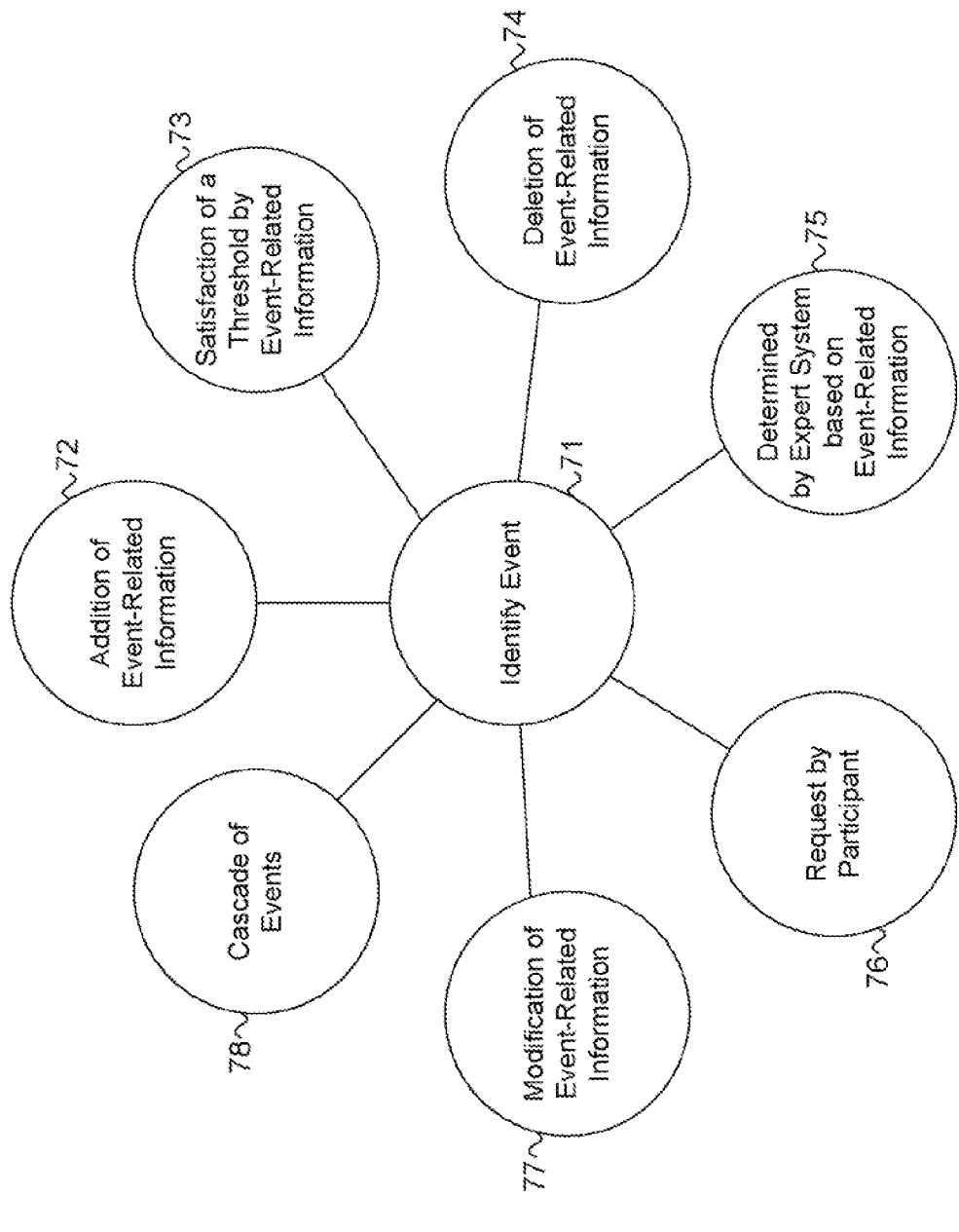
FIG. 6 is a data flow diagram showing processes for identifying an event.

A variety of methods can be used to identify a particular event. FIG. 6 is a process flow diagram showing processes for identifying an event. The event 71 can be identified by event rules, such as a change in the education-related information, a request for an event, a satisfaction of a threshold, a change in relation to a baseline, or as determined by an expert system. The change in the education-related information, which can include an addition 72, deletion 74, or modification 78 of the education-related information. For instance, an addition of education-related information can include the addition of a student score, the return of completed homework, enrollment of a new student, or a new discussion board posting. In contrast, a deletion of education-related information can include removal of an incorrect score or a student withdraw. Modification events can include changing a student score or student status. Other types of addition, deletion, and modification events are possible.

In addition, an event can be detected based on satisfaction of a pre-determined threshold 73 by the event-related information. For example, each student must maintain a course grade of 75 percent; otherwise, the student is not allowed to participate in extracurricular activities. Once a student falls below the 75 percent threshold, an event is identified and an alert is sent to interested individuals, such as a parent and coach. Other types of pre-determined thresholds are possible. An event can also be identified based on a change in relation to a baseline. For example, a student receives a score of six out of ten answers correct on an exam. Previously, the student received an average of nine out of ten answers correct. The new test score is analyzed against the previous scores to determine whether the change is significant to warrant the sending of an alert. Alternatively, the change may not be significant and is thus, an indication that the student had a bad day. Other types of baseline changes are possible.

Further, an event can be determined by an expert system 75 or provided by an individual 76. An expert system can monitor the education-related information and detect an event based on one or more factors. For instance, cheating can be detected by considering multiple factors, such as time, score, and student identity. A process is performed by the expert system 75 to identify the cheating event. In addition, an individual can request an event 76 by selecting a contact button or entering a notification into the online learning environment. For example, a parent may request communication with a teacher or the online learning staff may enter a notification that the online learning system will reboot within one hour. Other types of expert system determinations and individual provided events are possible.

A single event occurrence may trigger additional event occurrences to generate a cascade of events 78. For example, upon enrollment of a new student, an event is identified and an alert is delivered to one or more recipients. If the addition of the new student exceeds a number of subscriptions purchased, another alert is also generated. The new student alert and exceed subscription alert can be delivered individually or combined to form a single alert. Other methods for sending single or multiple alerts are possible.

During event identification, a benchmark is determined for inclusion in the alert. In a first example, a teacher performs an online educational activity by assigning homework to the students in an online course. The watcher identifies the addition of the homework to the online learning environment and the education-related information as an event. The homework assignment is identified as the benchmark. Even though the alert was received, the student may not be required to complete the homework if the student has already mastered the material or has obtained the points required for the online class. Thus, the student can determine whether he must complete the homework. In a second example, a site coordinator, such as an administrator, is responsible for the number of students enrolled in the online learning environment for a particular organization. The organization can include a school, home, after school group, and credit recovery organization. The organization is registered for a particular number of student enrollments, which is tracked by the watcher. The organization performs an online educational activity by registering a student in the online learning environment. Once the number of students enrolled reaches or exceeds the number of registrations, an event is identified and the number of students enrolled is the benchmark for the event. Alternatively, the benchmark could include a number of students above the number of registrations, the names of the students, or a cost for the additional students. The credit recovery organization can interpret the benchmark to determine whether they want to pay for the additional students or withdraw the students from registration. Benchmarks provide a starting point for recipient interpretation of an event provided in an alert.

Once an event is identified, a watcher determines whether the event requires an alert to be sent. If required, an alert is generated. Otherwise, the watcher continues to monitor the education-related information.

Generating an Alert

Figure 7:
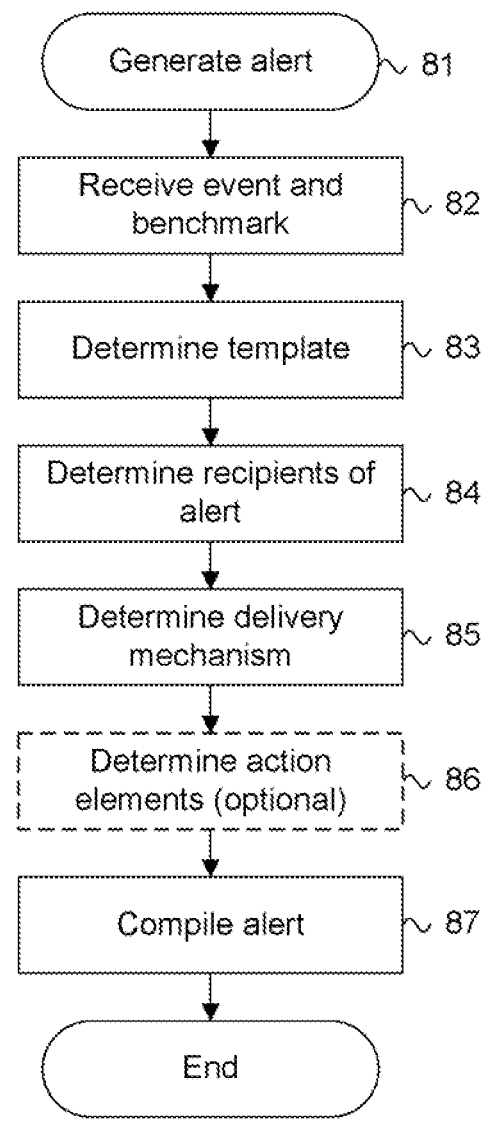
FIG. 7 is a process flow diagram showing a process for generating an alert.

Communication can be initiated between individuals associated with an online learning environment using an alert to provide near real time notification of an event. FIG. 7 is a process flow diagram showing a process 80 for generating an alert 81. An alert processor retrieves an event with a corresponding benchmark from a queue 82 and selects a template 83 based on factors, such as a type of the event, the benchmark, the subject matter of the event, or other factors. A template is a predetermined format for an alert. A standard template can be used for all alerts or generated for a specific type of alert. Alternatively, the template can be customizable. Each template can include text, fillable fields, or blank text boxes that are filled by the alert processor. Also, an individual, such as a teacher, student, or parent can manually fill the template. Other types of templates are possible. The alert processor then determines recipients of the alert 84. The recipients can be selected from the individuals of an online learning environment, including teachers, students, parents, administrators, mentors, members of the online learning staff, or others, such as counselors, paraprofessionals, and coaches. Alternatively, the recipients can include one or more members of an education support group.

Education support groups help individuals to learn together. The education support groups are formed from the individuals, which can be automatically selected based on factors, including a type of event, a subject of the event, or based on a relationship with one or more of the individuals, or as a combination of automatic and individual initiated groupings. For example, when a student is enrolled in the online learning environment, an education support group, including a teacher and a parent is automatically generated. However, the student may also work closely with a counselor or mentor, who can also be added to the education support group. Other methods of grouping and selecting recipients are possible.

After determining the recipients 84, the alert processor can determine one or more delivery mechanisms for the alert 85. The delivery mechanisms can include email, instant messaging, text messaging, and display on a Website. Selecting a delivery mechanism is described below with further reference to FIG. 10. Optionally, response action elements 86, such as action buttons, text recommendations, hyperlinks, and images can also be included in the alert. The response action elements can include interactive elements that allow recipients of an alert to perform a response action, such as obtaining or providing additional information, initiating a communication, sending an additional alert, and restricting or allowing access to the online curriculum. The response action elements can be selected by an individual, included with an alert template, or automatically selected based on a type of the event. Other types of response action elements and methods for selecting the response action elements are possible. The response actions and response action elements are discussed below with further reference to FIG. 14.

Once determined, the benchmark 82, template 83, recipients 84, delivery mechanisms 85, and response action elements 86 are compiled 87 to form the alert. Each recipient of an alert can enter user preferences for receiving particular types of alerts or for receiving the alerts through a particular delivery mechanism. Other types of user preferences are possible. Upon alert generation and determination of the user preferences, the alert is delivered.

Delivering an Alert

Figure 8:
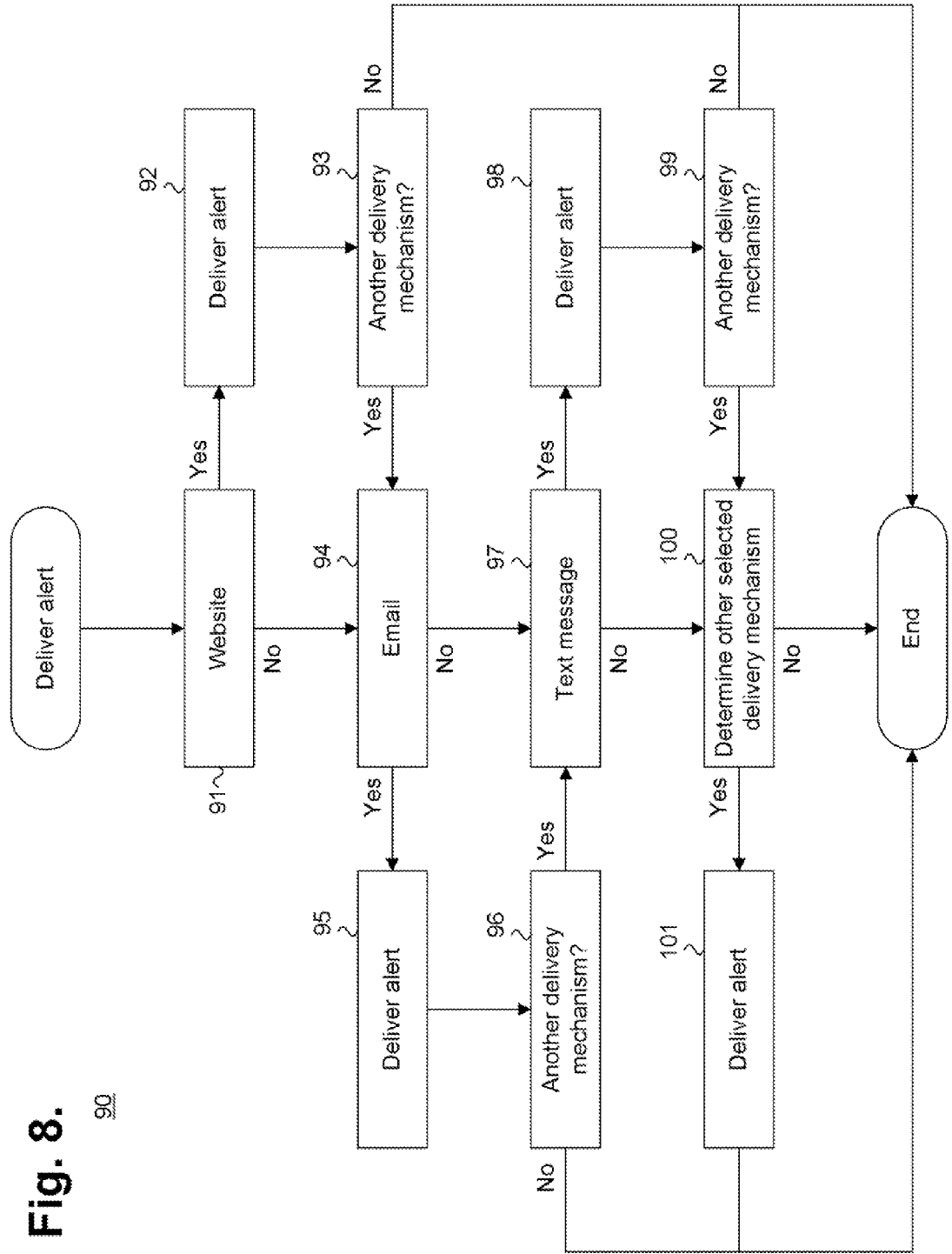
FIG. 8 is a process flow diagram showing a process for delivering an alert.

Each recipient can select to receive alerts via one or more delivery methods. FIG. 8 is a process flow diagram 90 showing a process for delivering an alert. An alert processor can access user preferences to determine delivery mechanisms for sending the alert. Alternatively, the delivery mechanisms can be automatically selected based on delivery factors, including a type of alert, designated recipients, or subject matter of the event. However, other types of delivery mechanisms, user preferences, and delivery factors are possible.

The alert processor determines whether an alert should be sent to a Website 91 based on the user preferences or delivery factors. If not, the alert processor then determines whether the alert should be sent via email 94. However, if so, the alert is delivered 92 and displayed. After delivery, the alert processor determines whether an additional delivery mechanism 93 is selected. If no other delivery mechanism has been selected, the delivery alert process ends. Otherwise, if another delivery mechanism is selected, the alert processor determines whether the alert should be sent via email 94 based on the user preferences and delivery factors.

If email 94 has not been selected as a method of delivery, the alert processor then determines whether an alert should be sent via text messaging 97. But, if selected, the alert is delivered via email 95. Once delivered, the alert processor determines whether another delivery method has been selected 96. If not, the delivery alert process terminates. However, if another delivery mechanism has been selected, the alert processor determines whether text messaging 97 has been selected as a delivery mechanism based on the user preferences and delivery factors. If not selected, the alert processor determines whether another delivery mechanism 100 has been selected, whereas the alert is delivered 98 when text messaging has been selected. After delivery, the alert processor determines whether another delivery mechanism 99 has been selected. If not, the delivery alert process ends. However, if another delivery mechanism 99 has been selected, the alert processor determines the type of delivery mechanism 100, and the alert is delivered using that delivery mechanism 101. The process ends after the alert has been delivered via all selected delivery mechanisms.

Upon receipt of the alert, each recipient can interpret a significance of the event using a benchmark. The benchmark is determined from a change in the online learning environment, including a change in education-related information, from the information provided by an individual to initiate an event, from threshold conclusions, from changes related to a baseline, or from conclusions by an expert system.

Interpreting a Benchmark

Figure 9:
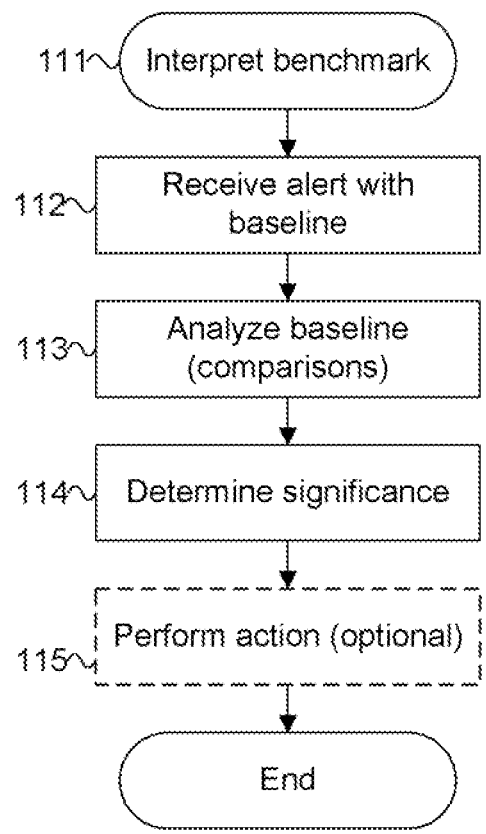
FIG. 9 is a process flow diagram showing a process for interpreting a benchmark.

A benchmark provides a starting point for a receiving individual to determine a significance of an event. FIG. 9 is a process flow diagram 110 showing a process for interpreting a benchmark 111. An individual receives an alert 112 with a benchmark for a particular event. The receiving individual can analyze the benchmark 113 by comparing interpretation data, such as graphs, previous student information, thresholds, and averages with the benchmark. The interpretation data can be included in the alert or accessed by the individual through the online learning environment. After analyzing the benchmark, the receiving individual can determine a significance of the event 114 provided by the alert. The determination of significance can prompt the individual to optionally perform a response action 115, including obtaining or providing additional information, initiating a communication, sending an additional alert, initiating a change to the education-related information, and restricting or allowing access to the online curriculum and education-related information. The response alert can include information directly entered by an individual or can be generated based on a change in the education-related information. Response actions are discussed below with further reference to FIG. 14.

An example of benchmark interpretation involves a student who is taking a math test online. Once the student has completed the exam, an alert is sent to the teacher to notify her that the exam has been completed. Upon receipt of the alert, the teacher can then select to grade the exam at anytime. After grading the exam, the teacher enters the test score for the student into the online learning environment. An alert is generated with a benchmark for the event, such as the score and delivered to the student. The alert notifies the student that he has received six out of ten answers correct. For this particular student, the score is significant since on a previous math exam, the student received two out of ten answers correct. Thus, the student has improved considerably since the previous math exam. However, another student who receives, a score of six out of ten answers correct may not conclude that the score is significant, such as a student who consistently receives the same scores.

In a further example, a member from the online learning staff requests an alert having a benchmark that provides notification of a system reboot to be sent to all administrators. The alert may be significant to one administrator who is generating reports via the online learning environment. However, the alert may be insignificant to another administrator who is on vacation. As described, different conclusions of significance can be formed from the same benchmark.

The alerts provide a near real time method of notifying recipients that an event has occurred. The recipients are provided with a benchmark transmitted in the alert to determine a significance of the event and whether a response action should be taken. Each recipient can customize the types of alerts received and the delivery mechanisms for receiving the alerts.

Response Actions

Once a recipient has determined a significance of the alert, response actions can be performed. The response actions can be performed independently by the recipient or based on suggested response actions provided by the alert. The suggested response actions can be displayed to a user by response action elements, such as action buttons, text recommendations, hyperlinks, and images, which are displayed in the alert message received. The text can provide a process or series of steps to perform in regards to a particular event, whereas, the action buttons can perform a particular action when selected by the recipient. The suggested response actions can be provided based on an expert system, related curriculum, and a related event. Other determinations and provisions of the suggested response actions are possible. The expert system can generate the suggested responses using expert knowledge to determine one or more appropriate response actions for a particular event. The expert knowledge is derived from a collective expertise of education professionals familiar with the functioning of the online learning environment. The response actions allow the recipients to obtain or provide additional information, initiate a communication, send an additional alert, initiate a change to the education-related information, and restrict or allow access to the online curriculum by selecting a response action element. The response actions and response action elements are discussed below with further reference to FIG. 14.

The recipient can select one or more suggested response actions based on an interpretation of the benchmark for an event. For example, an event, such as cheating or suspected cheating by a student can be detected using knowledge from the expert system. Upon detection, an alert is sent to an online teacher as notification of the cheating or suspected cheating event. The alert includes two response buttons and response text. If selected, the first button allows the teacher to restrict the student's access to the online curriculum and the second button allows the teacher to immediately notify the student. The text recommendation includes information from the expert system, which describes how the cheating event was determined. For instance, in this example, the student received a perfect score. However, the student took the same exam yesterday and received a score of 20 percent. In addition, the student only took one minute to complete the exam for which he received a perfect score.

The text also includes recommended steps for the teacher to follow with regards to the cheating event. For instance, a first step recommends that the teacher suspend the student's access to the curriculum. A second step suggests that the teacher review all the student's scores prior to initiating communication. A third step suggests discussing the event with the student over the phone, instead of through email. Based on the results of the third step, additional and alternative steps are also provided.

Alternatively, the response actions can be performed automatically on behalf of a user based on an event occurrence. For example, a student is enrolled in an online credit recovery program with the online learning environment. The student completes a chapter exam and receives a score of three out of ten. Upon identification of the student's low score, a study plan is generated by the expert system and transmitted to the student. The study plan is provided as an additional learning tool and can include a guide to mastering the material by outlining important subject matter, by providing a timeline for studying particular parts of the subject matter, and by providing additional information regarding the subject matter. When performed automatically, a notification of the response action is provided to one or more individuals, including for instance, one or more members of an education support group or the student himself.

The notification can include a message describing the reasons for performing the automatic response action and the automatic response itself. Returning to our previous example, a parent of the student may receive a notification identifying that their student received a low score and in turn, was provided with a study guide. Alternatively, the parent may also be provided with a notification having a copy of the study guide. In addition, the student can also receive a notification of the automated response action, such as when a hardcopy of the study guide is mailed. The notification informs the student that he will be receiving a study guide. Other types of notifications are possible.

Alert Screenshots

Figure 10:
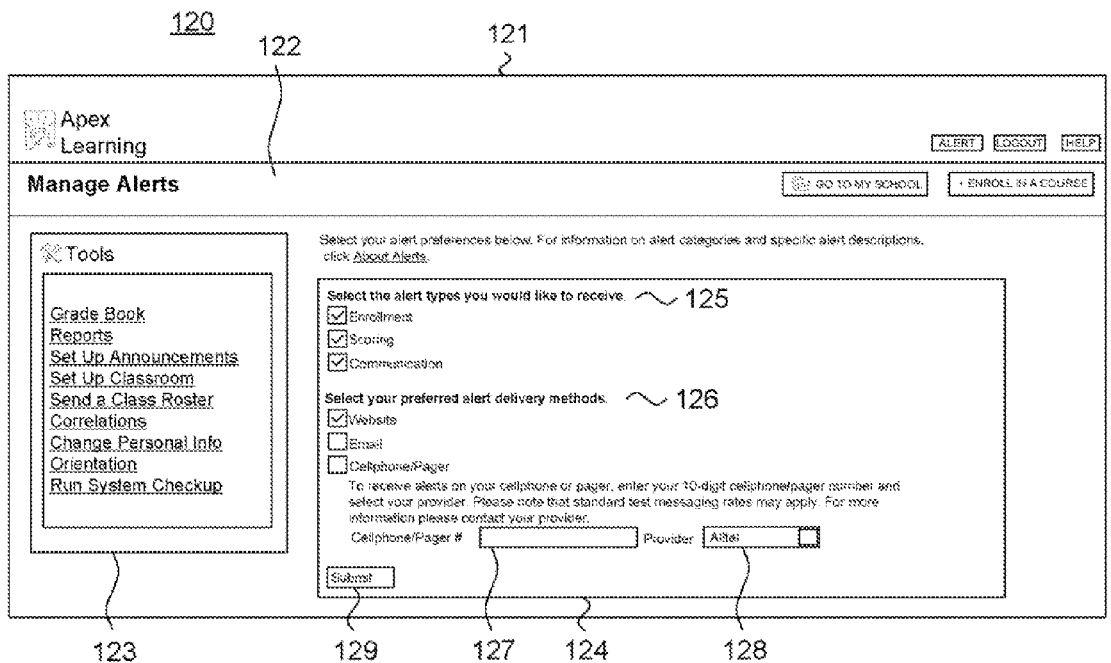
FIG. 10 is a screen shot showing, by way of example, a Website for entering user preferences.

Recipients can enter user preferences for customizing the type of alerts received and the delivery methods used. FIG. 10 is a screen shot 120 showing, by way of example, a Website 121 for entering user preferences. The Website includes a tab 122, which displays a title regarding the subject matter for the Web page. A tool box 123 is displayed on the left side of the Website, underneath the tab 122. The tool box 123 lists education actions that can be performed by the individual, including maintaining a grade book, generating reports, setting up announcements, setting up an online classroom, sending a class roster, preparing student correlations, changing personal information, preparing a course orientation, and running a system checkup. A user preference box 124 is located below the tab, on the right side of the Website 121. In the user preference box 124, an individual is able to select his preferences for types of alerts received and alert delivery methods. Other types of user preferences and displays for entering the user preferences are possible.

The individual can select to receive alerts from any of the categories of education-related information, described above with reference to FIG. 4, by clicking on a checkbox, selecting a category from a drop down menu, or by typing in a particular category. The individual can also select delivery mechanisms for receiving the alert. The delivery mechanisms include a display on a Website, an email, or text message. Other types of delivery mechanisms are possible, such as instant messaging. The individual may be required to provide additional information to ensure delivery via a selected method. For example, to receive alerts on a cellular telephone, the individual can enter his telephone number 127 and service provider 128. After entering the user preferences, the individual can select a submit button 129 to store the preferences. Other methods for entering and selecting user preferences are possible.

Figure 11:
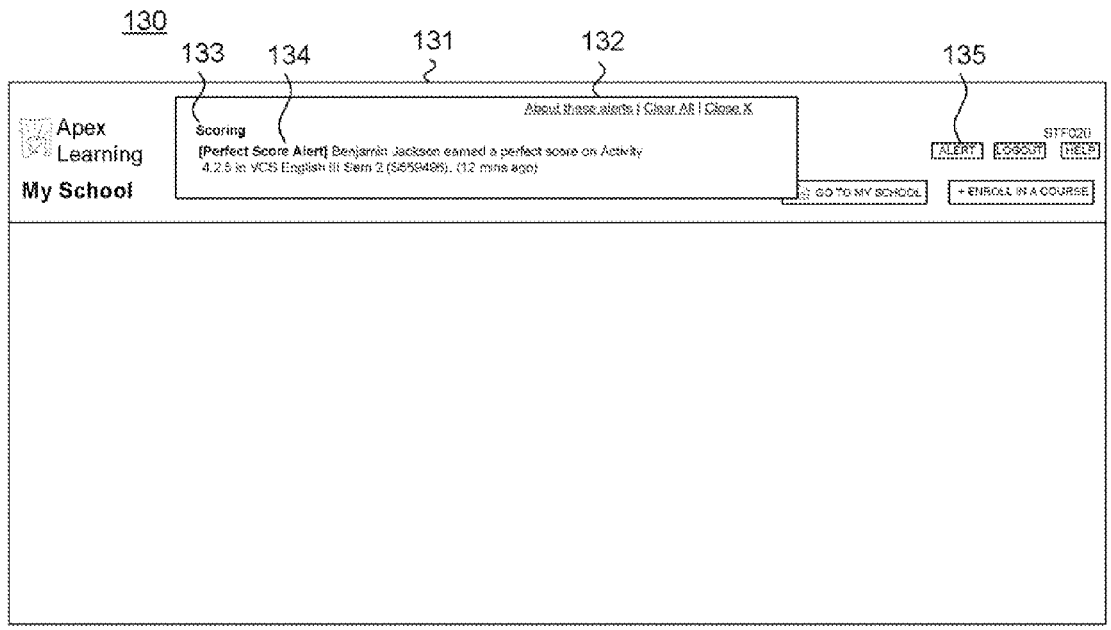
FIG. 11 is a screen shot showing, by way of example, an alert displayed on a Web page.

An alert is sent once the user preferences are set and an event is identified. FIG. 11 is a screen shot 130 showing, by way of example, an alert 132 displayed on a Website 131. Receipt of a new alert 132 can be displayed on the Website 131 as a pop up message, an icon, a highlighted menu option, or by an alert button 135. The individual can click on the pop up message, icon, highlighted menu option, or alert button 135 to view the alert. Alternatively, the alert 132 itself can be displayed as a pop up message 132 when the individual is logged in to the online learning environment. Each alert 132 can include a title 133 for a category of education-related information and a benchmark 134 for the event that triggered the alert. Other methods for displaying an alert on a Website and notifying an individual that an alert has been received are possible.

Figure 12:
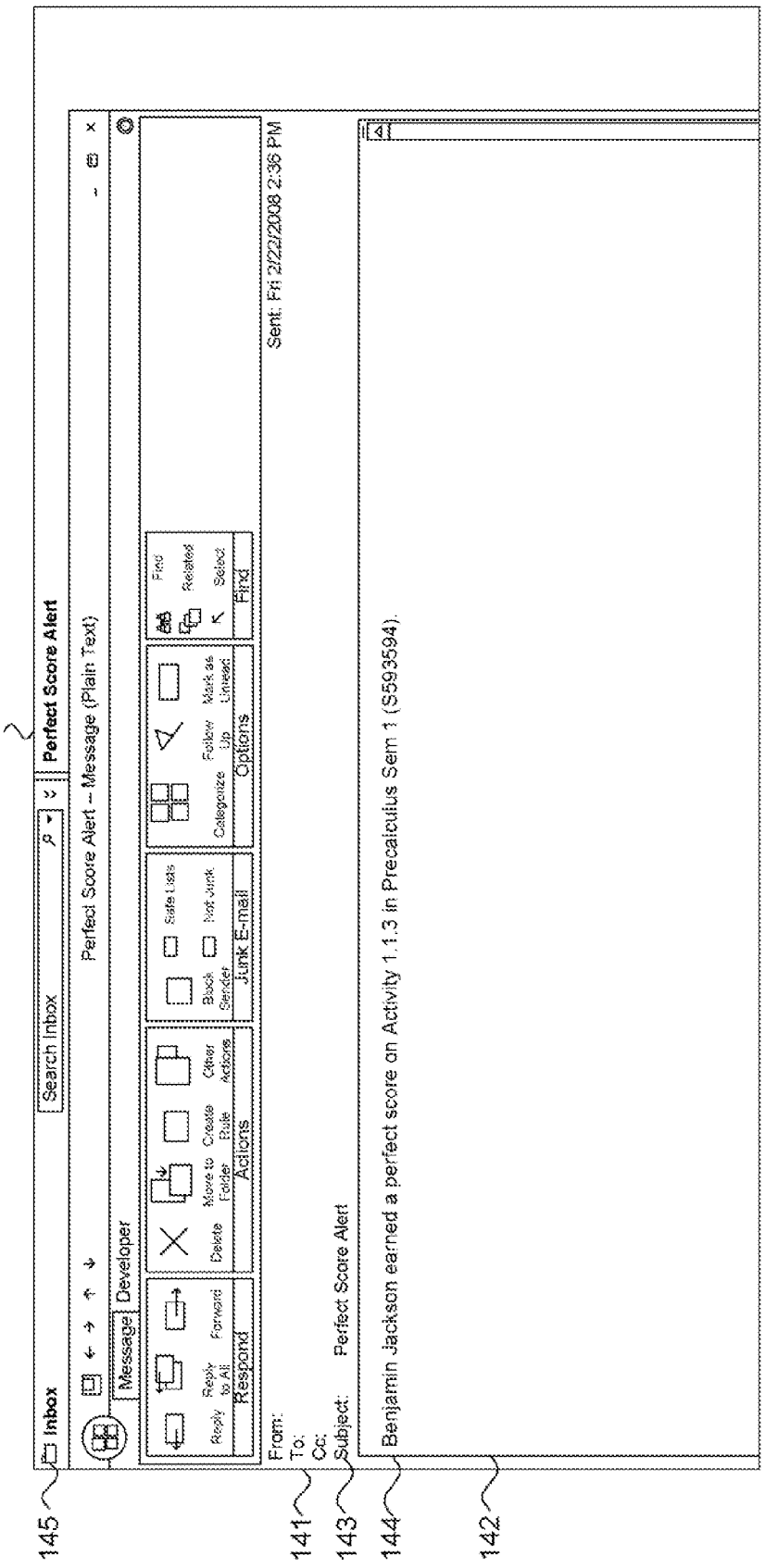
FIG. 12 is a screen shot showing, by way of example, an alert received via email.

The alert can also be received through email. FIG. 12 is a screen shot 140 showing, by way of example, an alert 142 received via email 141. An individual can access his email inbox 145 to determine whether an alert 142 has been received. The alert 142 can be identified by a title 146 of the event. The title 146 can also be used as a heading for the subject matter 143 of the email 141. The individual can select the email 141 to display a benchmark 144 for an event, which is located in a text box 142. Other methods for displaying an alert by email are possible.

Figure 13:
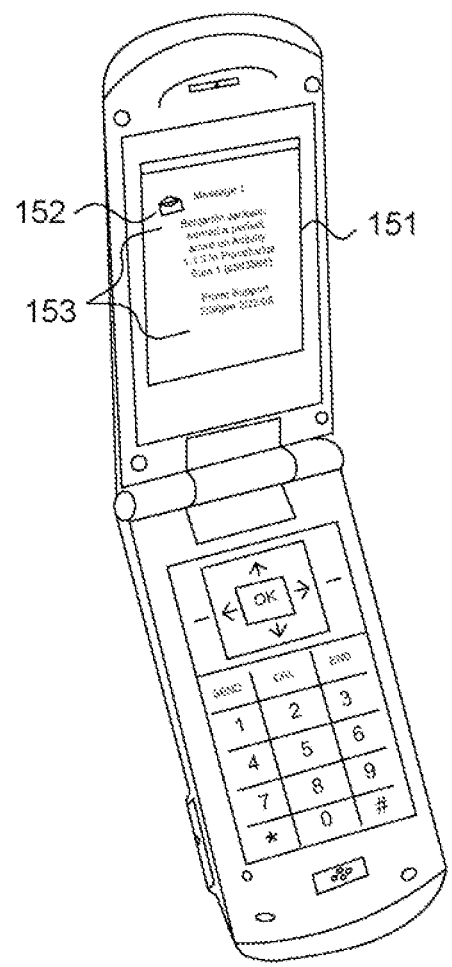
FIG. 13 is a block diagram showing, by way of example, an alert received via a text message.

The alert can also be received through a text message. FIG. 13 is a block diagram 150 showing, by way of example, an alert 151 received via a text message 152. The alert 151 is displayed on a cellular telephone to notify the individual that an event has occurred. A benchmark 153 is also displayed. Other displays and delivery methods for an alert are possible.

Figure 14:
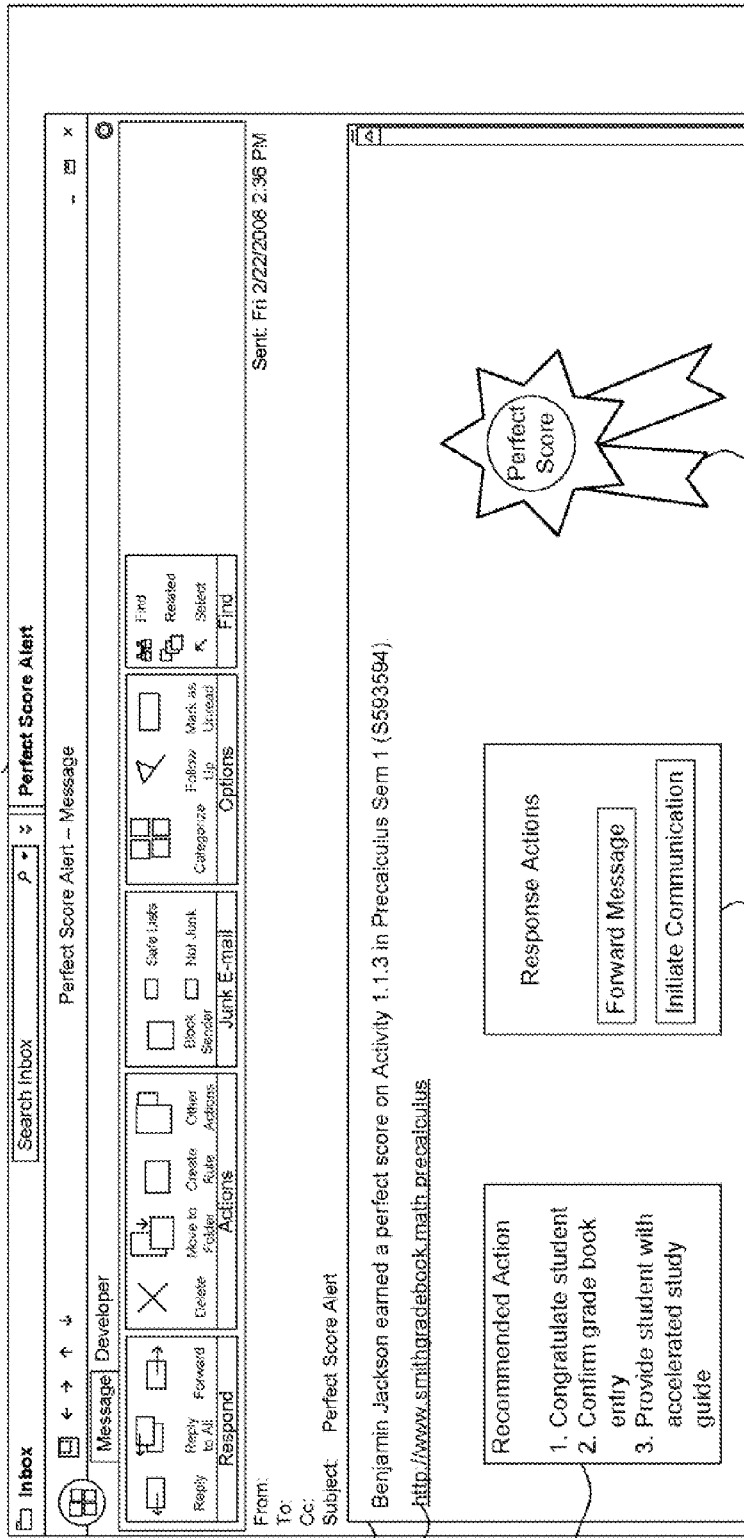
FIG. 14 is a screen shot showing, by way of example, an alert with response action elements.

Each type of alert can include response action elements for allowing recipients of the alert to perform actions in response to an event. FIG. 14 is a screen shot 160 showing, by way of example, an alert 161 with response action elements. The response action elements can include action buttons 166, text recommendations 163, hyperlinks 164, and images 165. The alert is displayed in an email 162 and notifies a recipient that a particular student has earned a perfect score on Activity 1.1.3 in a precalculus class.

The text recommendations 163 can provide a process, list of recommended steps, detailed information of the event, historical information, subscription numbers and cost, or contact information to the recipient. The hyperlinks allow the recipient to quickly and easily access a Web page for performing a response action. In addition to the hyperlinks, the response action buttons 166 can also allow the recipient to initiate a response action. The response action buttons 166 can include response actions, such as forwarding a message, initiating a communication, recording an event, and purchasing additional subscriptions. Images, such as an award medal, copy of a grade book, and videos can also be displayed in the alert. Other types of response action elements and response actions are possible.

The recipient of an alert may be part of an education support group created for an individual of the online education environment, such as the student. The education support group includes multiple individuals with an interest in education-related information or in the particular student enrolled in the online learning environment. Alerts can be transmitted to one or more of the individuals based on a type of the alert. Further, the response actions provided by the response action elements can be selected based on a type of the individual. For example, when a student receives a perfect score, an alert is sent to an education support group associated with the student. The education support group may include a teacher, parent, and mentor, as well as other individuals with an interest in the student's educational progress. The alert received by the teacher may include response action elements for response actions, such as sending a congratulations message to the student and a hyperlink to a grade book for ensuring the perfect score is recorded. Since the parent and mentor are unable to access the grade book, their alerts contain only the response action element for sending the congratulations message.

In a further embodiment, the alerts can be customized by the online learning staff, teachers, students, parents, or administrators. The customization can include layout, text, hyperlinks, animation, color, and sound. Other types of customization are possible.

In a further embodiment, the education-related information can be used to generate comparisons within, between, and among different groupings of individuals and organizations associated with the online learning environment. The individuals can include administrators, teachers; students, and others. The comparisons can be based on a comparison factor, such as location, age, social economic class, dropout rate, organization size, ethnic background, student behavior, or the groupings.

In addition, the comparisons can be used to evaluate the progress of one or more individuals or organizations. For instance, a first teacher teaches a geometry class for a group of students located in the city of Seattle, Wash. Upon termination of the course, cumulative scores for each student are combined to generate an evaluation indicator for the geometry class. The evaluation indicator can then be used for comparing with another evaluation indicator for a geometry class taught by a second teacher under the same conditions. The same conditions can be evaluated using the comparison factors. Thus, the second teacher may teach a geometry class in the city of Portland, Oreg., which is fairly comparable to Seattle in size, population, and ethnic background. The comparison of the indicators can be used to evaluate the teachers' performance, as well as the students' performance.

In a further embodiment, an event occurrence may have an effect on the occurrence of an additional event. For example, a student has been caught cheating. The process and rules for determining cheating is changed to a lower standard for that student to identify further instances of suspected cheating.

In yet a further embodiment, an individual can override a particular alert by selecting an override button or by entering a particular subject matter of the alert. The override prevents individuals from receiving alerts they would ordinarily receive, such as during a meeting or online class seminar.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing student performance alerts in an online learning environment, comprising:
   a watcher module to monitor an online learning environment;
   an event module to receive a performance score for a test taken by a student at a first time and to further obtain one or more previous performance scores for previous tests taken by the student at previous times;
   a comparison module to compare the performance score with one or more of the previous performance scores and to determine a performance difference between the performance score and the one or more previous performance scores;
   a significance determination module to determine whether the performance difference between the performance score and the one or more previous performance scores is significant, comprising:
     a threshold module to apply a change threshold to the performance difference; and
     a difference determination module to determine that the performance difference is significant when the performance difference falls outside the threshold;
   a delivery module to transmit an alert for the significant performance difference to the student; and
   a processor to execute the modules.

2. A system according to claim 1, further comprising:
   an alert generator to generate the alert by selecting an alert template and populating the alert template with the significant performance difference.

3. A system according to claim 1, further comprising:
a cumulative score module to determine a cumulative performance score for the student by adding the performance score to the previous performance scores;
a threshold determination module to apply a grade threshold to the cumulative performance score; and
the delivery module to transmit an alert to the student when the cumulative performance score falls below the threshold.

4. A system according to claim 1, wherein the delivery module further transmits an alert to the student comprising at least one of the significant performance difference, a study plan, and a notification to contact one of a teacher and administrator.

5. A system according to claim 1, further comprising:
a cheating determination module to apply a cheating threshold to the significant performance difference and to determine an occurrence of suspected cheating when the significant performance difference satisfies the cheating threshold.

6. A system according to claim 1, wherein the previous tests are at least one of the same test and a different test.

7. A system according to claim 1, wherein the significant performance difference indicates at least one of an increase and a decrease in the student' performance.

8. A method for providing student performance alerts in an online learning environment, comprising:
monitoring an online learning environment;
receiving a performance score for a test taken by a student at a first time;
obtaining one or more previous performance scores for previous tests taken by the student at previous times;
comparing the performance score with one or more of the previous performance scores and determining a performance difference between the performance score and the one or more previous performance scores;
determining whether the performance difference between the performance score and the one or more previous performance scores is significant, comprising:
applying a change threshold to the performance difference; and
determining that the performance difference is significant when the performance difference is outside the threshold; and
transmitting an alert for the significant performance difference to the student.

9. A method according to claim 8, further comprising:
generating the alert, comprising:
selecting an alert template; and
populating the alert template with the significant performance difference.

10. A method according to claim 8, further comprising:
determining a cumulative performance score for the student by adding the performance score to the previous performance scores;
applying a grade threshold to the cumulative performance score; and
transmitting an alert to the student when the cumulative performance score falls below the threshold.

11. A method according to claim 8, further comprising:
transmitting to the student, an alert comprising at least one of the significant performance difference, a study plan, and a notification to contact one of a teacher and administrator.

12. A method according to claim 8, further comprising:
applying a cheating threshold to the significant performance difference; and
determining an occurrence of suspected cheating when the significant performance difference satisfies the cheating threshold.

13. A method according to claim 8, wherein the previous tests comprise at least one of the same test and a different test.

14. A method according to claim 8, wherein the significant performance difference indicates at least one of an increase and a decrease in the student's performance.

15. A system for monitoring student progress in an online learning environment, comprising:
a database to maintain learning material in an online learning environment, comprising a plurality of students;
a measure module to set a predetermined number of times for at least one of the students to pass a test;
an event module to receive one or more failing scores for the test taken by the student at different times;
a score comparison module to compare a number of the one or more failing scores to the predetermined number of times to pass the test for that student;
an access module to temporarily block the student's access to at least a portion of the learning material in the online learning environment when the number of failing scores exceeds the predetermined number of times to pass the test; and
a processor to execute the modules.

16. A system according to claim 15, further comprising:
a group recipient module to form a customized group of users associated with the student and to transmit an alert comprising notification of the blocked student access to the customized group.

17. A system according to claim 15, further comprising:
an instruction module to receive instructions to unblock the student from at least one of a teacher and an administrator in the online learning environment to allow the student to access the learning material.

18. A system according to claim 15, wherein the learning material comprises at least one of homework assignments, lessons, online tests, and progress reports.

19. A method for monitoring student progress in an online learning environment, comprising:
maintaining learning material in an online learning environment, comprising a plurality of students;
setting a predetermined number of times for at least one of the students to pass a test;
receiving one or more failing scores for the test taken by the student at different times;
comparing a number of the one or more failing scores to the predetermined number of times to pass the test for that student; and
temporarily blocking the student's access to at least a portion of the learning material in the online learning environment when the number of failing scores exceeds the predetermined number of times to pass the test.

20. A method according to claim 19, further comprising:
forming a customized group of users associated with the student; and
transmitting an alert comprising notification of the blocked student access to the customized group.

21. A method according to claim 19, further comprising:
receiving instructions to unblock the student from at least one of a teacher and an administrator in the online learning environment to allow the student to access the learning material.

22. A method according to claim 19, wherein the learning material comprises at least one of homework assignments, lessons, online tests, and progress reports.

* * * * *